April 21, 1953   B. SMALLER   2,636,118
PULSE EQUALIZER
Filed Feb. 28, 1952   3 Sheets-Sheet 2

INVENTOR.
Bernard Smaller
BY
Roland A. Anderson
Attorney

April 21, 1953 B. SMALLER 2,636,118
PULSE EQUALIZER
Filed Feb. 28, 1952 3 Sheets-Sheet 3
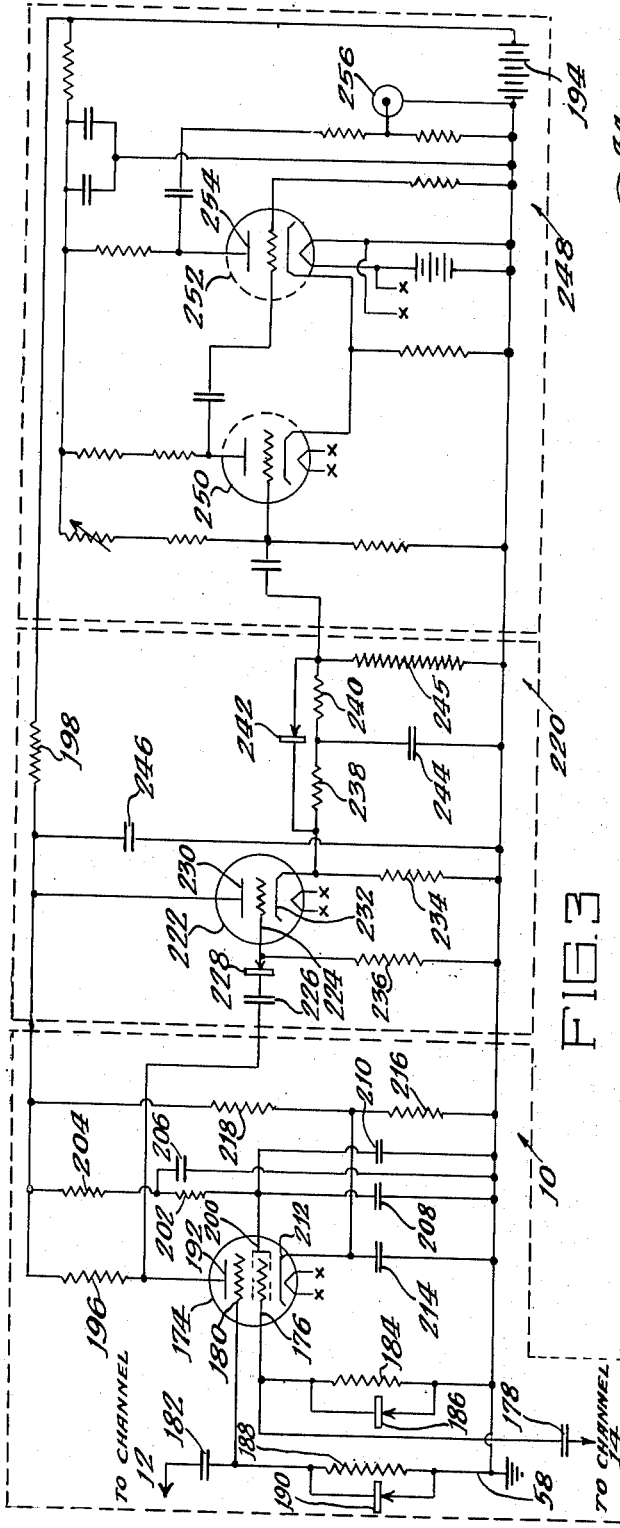
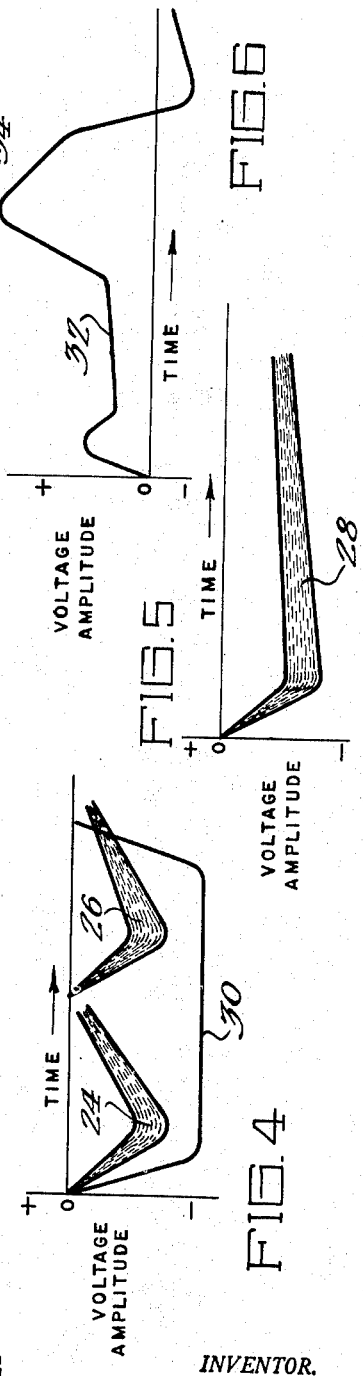
INVENTOR.
Bernard Smaller
BY
Roland A Anderson
Attorney Patented Apr. 21, 1953

2,636,118

UNITED STATES PATENT OFFICE 2,636,118

PULSE EQUALIZER

Bernard Smaller, Chicago, Ill., assignor to the United States of America as represented by the United States Atomic Energy Commission Application February 28, 1952, Serial No. 273,905

12 Claims. (Cl. 250—27)

1

The present invention relates to devices for equalizing pulses of different amplitudes, and more specifically to devices for counting pulse coincidences from different sources.

In the past, many devices have been used to transform pulses of random amplitudes into pulses of equal amplitudes. One well known device for accomplishing this purpose is the multivibrator which produces a pulse with a predetermined amplitude for each input pulse irrespective of the amplitude of the input pulse, provided that all of the input pulses are of sufficient amplitude to trigger the multivibrator. However, such circuits are triggered when the incoming pulses reach a threshold amplitude. Since the time required for a pulse to reach this threshold value is a function of the amplitude of the pulse, pulses of different amplitudes will not be triggered at the identical time lapse after the pulse is impressed upon the multivibrator.

Many devices require equal lapse times for all of the incoming pulses, regardless of the amplitude of the pulses. One such device is the coincidence counter which records the occurrence of two pulses within a small time interval. Here it is clear that different delay times in transforming the original pulses to pulses of equal amplitude will cause the coincidence counter to fail to record some coincidences of pulses.

It is an object of the present invention to provide a device for transforming pulses of random amplitudes into pulses of equal amplitude in which the delay time for all pulses is essentially constant.

It is also an object of the present invention to provide devices for counting the coincidences of pulses, even when the pulses are of different amplitudes.

Further objects and advantages of the present invention will become readily apparent to the man skilled in the art from a further reading of the present specification and claims, particularly when viewed in the light of the drawings, in which:

Figure 3 is a schematic electrical circuit diagram of a coincidence mixer, integrator and discriminator, and output multivibrator, such as illustrated in the corresponding blocks of Figure 1;

Figure 4 is an illustrative graph showing the shape of the electrical pulses generated in different portions of the circuit by a typical signal pulse;

Figure 5 is a graph showing typical pulses generated by signal pulses at the output of the integrating circuit; and Figure 6 is a graph of a typical electrical pulse developed at the output of one of the incoming channels from a signal pulse.

Figure 1:
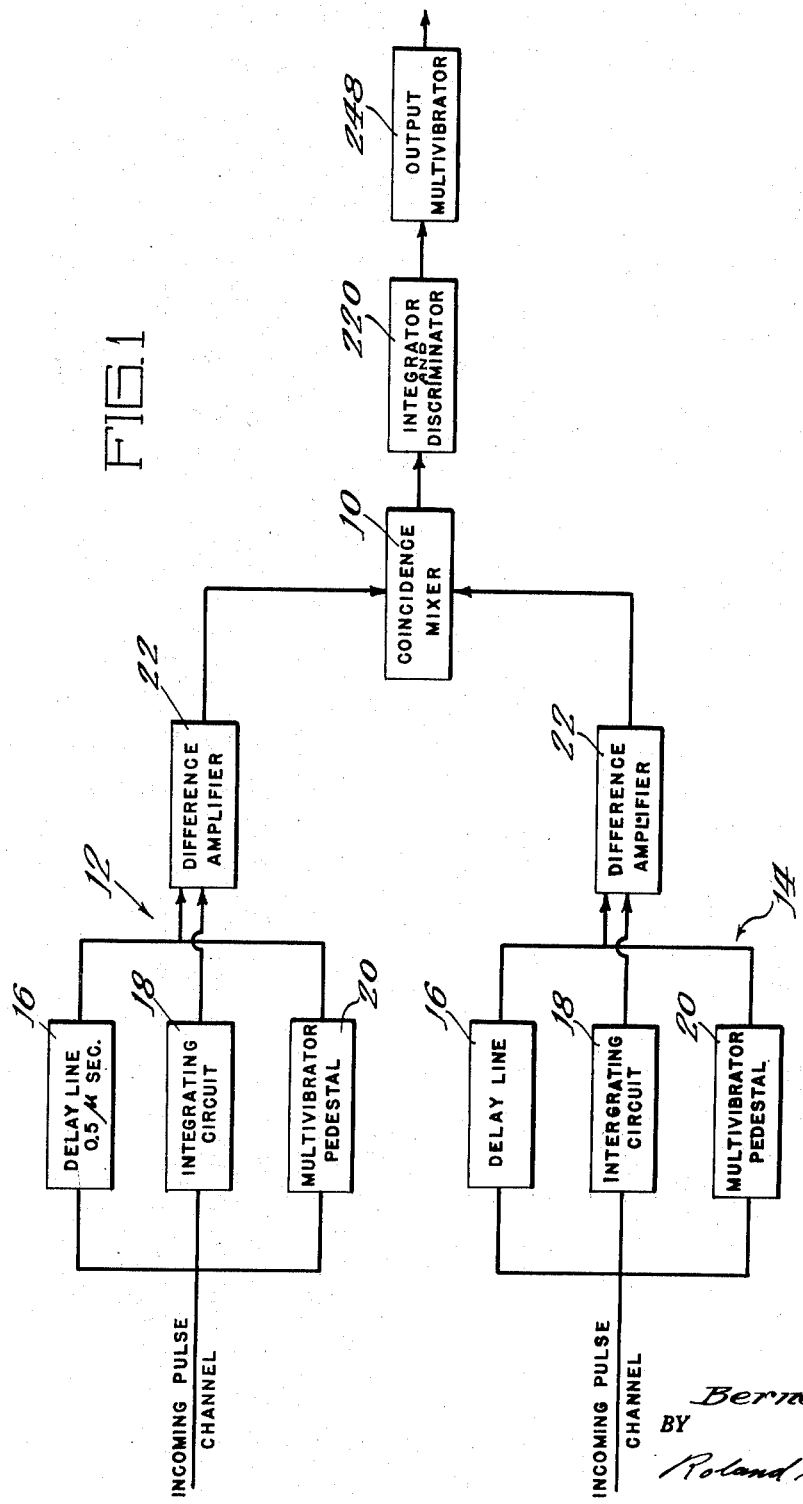
Figure 1 is a schematic block diagram of a coincidence counting device illustrating the teachings of the present invention.

The present invention may be used to count the coincidences of pulses generated by any two signal pulse sources, such as the pulses emerging from counters, ionization chambers, or scintillation counters.

The signal pulses generated by each of the two pulse sources are conducted to a coincidence mixer 10 through separate channels 12 and 14. While the present circuit has been designed to count the coincidences of pulses from two pulse sources, it will be clear to the man skilled in the art that the circuit could be readily modified to count the coincidences of pulses from any number of pulse sources, an additional pulse channel being used with an additional coincidence mixer for each additional pulse source.

Each of the pulse channels 12 and 14 comprises a delay line circuit 16, an integrating circuit 18, a pedestal multivibrator 20, and a difference amplifier 22.

The method of obtaining pulses of equal amplitude and uniform delay time from random amplitude pulses may be explained with reference to Figures 1, 4, 5 and 6. If it is assumed that a negative signal pulse is impressed upon the pulse channel 12 or 14 with approximately the shape shown at 24 in Figure 4, the delay line circuit 16 will delay the pulse for a predetermined period of time, for example one-half microsecond, to form the pulse illustrated at 26 in Figure 4.

It will be noted that the amplitudes of both pulses 24 and 26 will not be constant, but will be between upper and lower limits, in general. This fact has been illustrated where appropriate in all of the figures by showing the upper and lower limits in solid lines and shading the area between the solid lines.

At the same time that the delay line circuit 16 is delaying the signal pulse, the integrating circuit 18 will convert the signal pulse to a pulse of a long duration shown at 28 in Figure 5. This pulse is much longer in duration than any of the signal pulses themselves. Also, the amplitude of each of the integrated pulses 28 substantially equals the amplitude of the delayed pulse 26 resulting from the same signal pulse. The delayed pulses 26 and the integrated pulses 28 are impressed upon the input of the difference amplifier 22. The pedestal multivibrator 20 also generates a negative pulse 30 which is algebraically added to the pulses 26 and 28 at the input of the difference amplifier 22. It is to be noted, that even though all three pulses 26, 28 and 30 which are impressed upon the difference amplifier 22 are negative, the effect of the integrated pulse 28 upon the output of the difference amplifier 22 is to oppose the other two pulses 26 and 30.

The purpose of the pedestal pulses 30 is to provide the pulses resulting from the difference of the delayed pulses 26 and the integrated pulses 28 with sufficiently positive amplitude to permit the coincidence mixer 10 to operate efficiently, however, the pedestal pulses 30 do not contribute to the uniform amplitudes of the pulses emerging from each channel, or to the uniform delay time, except insofar as they are maintained at a constant amplitude.

The three pulses 26, 28 and 30 which are generated from each signal pulse are merged into a single pulse 32 appearing in the output of the difference amplifier 22, shown in Figure 6. It will be noted, that the apex of the pulse 26 appears in the pulse 32 at the point 34, and that this point 34 is a point of uniform time delay and constant amplitude for all signal pulses. The amplitude of the point 34 is equal to the amplitude of the pedestal pulse 30, since the delayed pulse 26 and integrated pulse 28 cancel each other at this point. Also, the delay time for all pulses 32 will be substantially uniform, since only a very small proportion of the apex of each signal pulse 24 is used for purposes of triggering circuits due to the fact that the amplitude of the point 34 on each pulse 32, regardless of the amplitude of the signal pulse, will be equal to that of the pedestal pulses 30.

Figure 2:
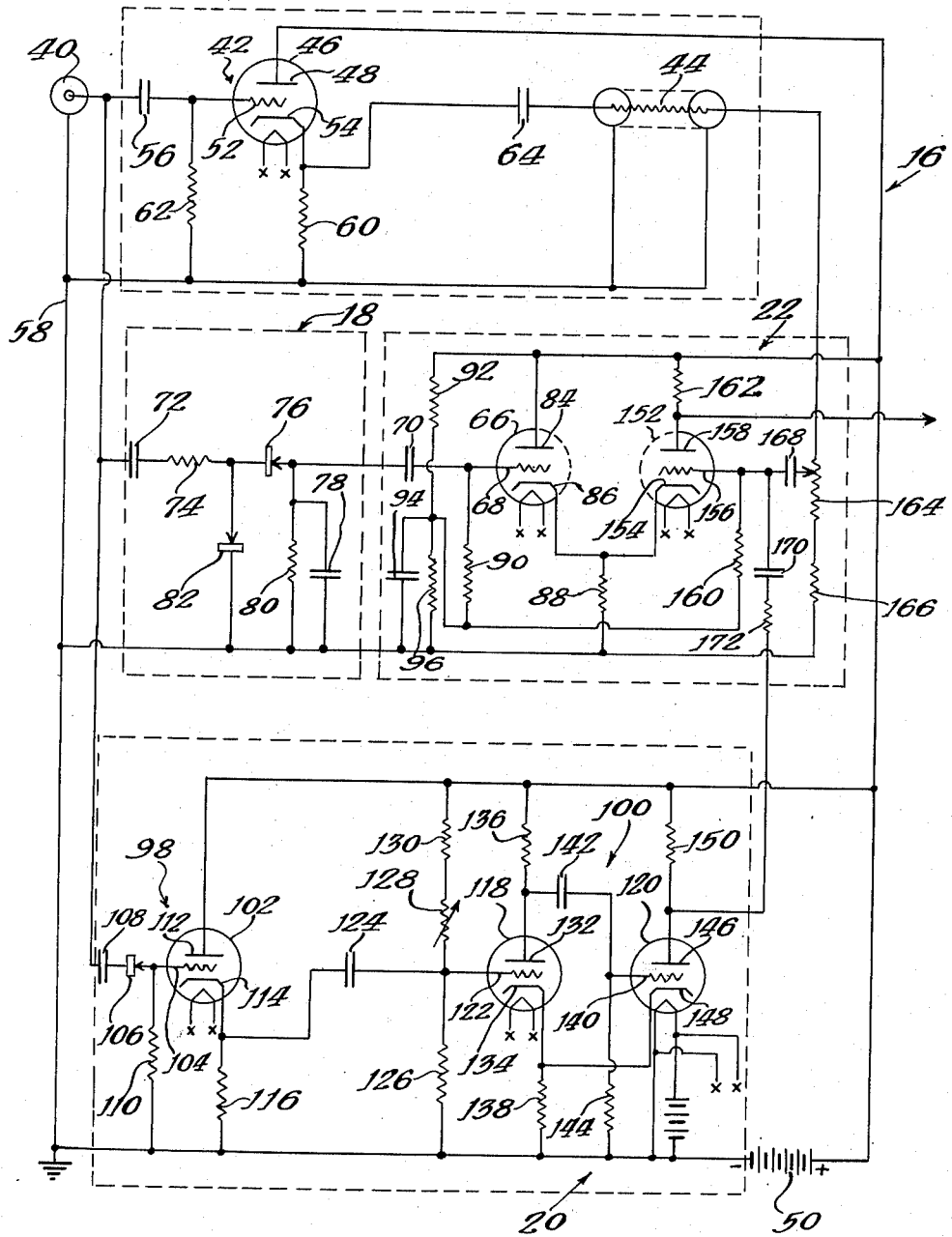
Figure 2 is a schematic electrical circuit diagram of one of the two incoming pulse channels.

Figure 2 shows a schematic circuit diagram of the circuits which constitute one of the channels 12 or 14. An input connector 40 is adapted to be connected to one of the two sources of signal pulses whose coincidences are to be counted. One terminal of the input connector 40 is connected to the inputs of the delay line circuit 16, the integrating circuit 18 and the pedestal multivibrator 20, and the other terminal of the input connector 40 is connected to the common reference, or ground, circuit 58.

The delay line circuit 16 consists of a cathode follower amplifier 42 and a delay line 44. The cathode follower amplifier has a vacuum tube 46 with a plate 48 connected directly to the positive terminal of a source of power, such as battery 50. Vacuum tube 46 also has a grid 52 and a cathode 54, the grid 52 being connected to one terminal of the input connector 40 through a condenser 56, and the cathode 54 being connected to the other terminal of input connector 40 through a cathode resistor 60. A grid bias resistor 62 is connected between the grid 52 and the ground circuit 58. The delay line 44 is coupled to the cathode 54 through a coupling condenser 64. The delay line 44 is constructed to provide a one-half microsecond delay for all pulses, and the cathode follower 42 provides a high impedance to low impedance coupling between the input connector 40 and the delay line 44.

The integrating circuit 18 is also connected to the input connector 40 in the same manner as the delay line circuit 16, and includes a condenser 72, resistor 74, and crystal rectifier 76 connected in series to pass only negative charges from the input connector 40 to the difference amplifier 22. A resistor 80 and a condenser 78 are connected in parallel between the ground circuit 58 and the output side of the crystal rectifier 76, and a second crystal rectifier 82 is connected to pass positive charges from the junction between the resistor 74 and the crystal rectifier 76 to the ground circuit 58.

The pedestal multivibrator 20 comprises a cathode follower 98 and a multivibrator 100. The cathode follower 98 uses a vacuum tube 102 having a grid 104 connected to the input connector 40 through a crystal rectifier 106 and a coupling condenser 108. A grid bias resistor 110 connects the grid 104 to the ground circuit 58. Vacuum tube 102 also includes a plate 112 directly connected to the positive terminal of battery 50, and a cathode 114 connected to the ground circuit 58 through a cathode resistor 116.

The multivibrator 100 includes a pair of vacuum tubes 118 and 120. Vacuum tube 118 has a grid 122 connected to the cathode 114 of vacuum tube 102 through a coupling condenser 124. The grid 122 of vacuum tube 118 is also connected to the ground circuit 58 through a grid resistor 126, and to the positive terminal of battery 50 through the series connected potentiometer 128 and resistor 130. Vacuum tube 118 is also provided with a plate 132 and a cathode 134, the plate 132 being connected to the positive terminal of battery 50 through a plate resistor 136, and the cathode 134 being connected to the ground circuit 58 through a cathode resistor 138. Vacuum tube 120 is provided with a grid 140 coupled to the plate 132 of the vacuum tube 118 through a condenser 142. The grid 140 of vacuum tube 120 is also connected to the ground circuit through a grid bias resistor 144. Vacuum tube 120 has a plate 146 and a cathode 148, the cathode 148 being directly connected to the cathode 134 of vacuum tube 118, and the plate 146 being connected to the positive terminal of battery 50 through a plate resistor 150.

The difference amplifier 22 has a cathode follower using a vacuum tube 66 and an amplifier using a vacuum tube 152. Vacuum tube 66 is provided with a grid 68 which is coupled to the crystal rectifier 76 of the integrating circuit 18 through a condenser 70; and a plate 84 directly connected to the positive terminal of battery 50. A positive bias is placed upon the grid 68 of vacuum tube 66 by means of a voltage divider connected across the terminals of battery 50, the voltage divider consisting of series connected resistors 90 and 92 connected between the positive terminal of battery 50 and the grid 68, and parallel connected condenser 94 and resistor 96 connected between the ground circuit 58 and the junction between resistors 90 and 92. Vacuum tube 66 is also provided with a cathode 86 which is connected to the ground circuit 58 through a resistor 88. Vacuum tube 152 has a cathode 154 directly connected to the cathode 86 of vacuum tube 66. Vacuum tube 152 is also provided with a positively biased grid 156 which is connected through resistor 160 to the junction point between resistors 90 and 92. The grid 156 is also connected to the plate 146 of vacuum tube 120 of the pedestal multivibrator 20 through series connected coupling condenser 170 and resistor 172. The grid 156 is also coupled to the output of the delay line circuit 16 through a coupling condenser 168 and a voltage dividing network consisting of resistor 166 and rheostat 164 connected between the delay line 44 and the ground circuit 58. Vacuum tube 152 is also provided with a plate 158 which is connected to the positive terminal of battery 50 through a plate resistor 162.

The operation of the wave shaping circuits shown in Figure 2 may now be described. A negative signal pulse from a pulse source is impressed upon the grids 52 of vacuum tube 46, 104 of vacuum tube 102, and upon the integrating circuit 18. The cathode follower 98 of the pedestal multivibrator 20 immediately conducts the negative pulse to the multivibrator 100 causing vacuum tube 120 to become conducting and placing a negative pulse (pulse 30 shown in Figure 4) on the grid 156 of vacuum tube 152 in the difference amplifier 22. At the same time, the negative signal pulse is integrated by the integrating circuit 18 and conducted to the grid 68 of the difference amplifier 22. As a result, a negative integrated pulse 28 (Figure 5) appears upon the cathode 86 of vacuum tube 66 and also upon the cathode 154 of vacuum tube 152 of the difference amplifier 22. This pulse in effect drives the grid 156 of vacuum tube 152 more positive. The cathode follower 42 of the delay line circuit 16 immediately conducts the negative signal pulse from connector 40 to the delay line 44 where it is retarded by approximately one-half microsecond, this pulse being illustrated as pulse 26 in Figure 4. This pulse 26 remains negative in polarity, and is impressed upon the grid 156 of vacuum tube 152 of the difference amplifier 22 to oppose the pulse 28 from the integrating circuit 18 resulting from the same signal pulse. Pulse 30 from the pedestal multivibrator 20 adds to the delayed pulse 26. In this manner, pulses 26, 28 and 30, illustrated in Figures 4 and 5, are impressed upon the difference amplifier 22 resulting in pulse 32, shown in Figure 6, which appears upon the plate 158 of vacuum tube 152 of the difference amplifier 22.

In one particular construction embodying the present invention, one section of a type 12AU7 vacuum tube was used for vacuum tube 46 of the delay line circuit 16, and the other section of the type 12AU7 vacuum tube was used for vacuum tube 102 of the multivibrator pedestal circuit 20. In like manner, type 12AU7 vacuum tubes were used for vacuum tubes 66 and 152, and vacuum tubes 118 and 120. Battery 50 delivered 250 volts D. C., and the delay line circuit 16 used a 1100 ohm delay line adapted to provide a delay of 0.5 microsecond. The grid 122 of vacuum tube 118 of the pedestal multivibrator 20 was positively biased 12 volts with respect to the ground circuit 58, and the cathode 134 was biased a positive 15 volts with respect to the ground circuit 58. The crystal rectifiers 76, 82, and 106 were all type 1N34 crystal rectifiers. The grids 68 and 156 of vacuum tubes 66 and 152 in the difference amplifier 22 were biased a positive 17 volts, while the cathodes 86 and 154 of these tubes were positively biased 20 volts with respect to the ground circuit 58.

As stated, the outputs from the difference amplifiers 22 in each of the pulse channels 12 and 14 are impressed upon the coincidence mixer 10. The coincidence mixer 10 is shown in detail in Figure 3, and includes a vacuum tube 174 of the gated beam type. A first control grid 176 is coupled to the plate 158 of the difference amplifier 22 of channel 14 through a coupling condenser 178, while a second control grid 180 is coupled similarly to the difference amplifier 22 of channel 12 through a coupling condenser 182. The first control grid 176 is connected to the ground circuit 58 through a grid resistor 184 and a crystal rectifier 186 connected in parallel with the resistor 184, and the second control grid 180 is likewise connected to the ground circuit 58 through a resistor 188 connected in parallel with a crystal rectifier 190. Vacuum tube 174 has a plate 192 connected to the positive terminal of a battery 194 through a plate resistor 196 and a voltage dropping resistor 198. Vacuum tube 174 also has an accelerator 200 connected to the junction between the plate resistor 196 and the voltage dropping resistor 198 through series connected resistors 202 and 204, the junction between resistors 202 and 204 being by-passed to the ground circuit 58 through a by-pass condenser 206. The accelerator 200 is also by-passed to ground through condensers 208 and 210. Vacuum tube 174 has a cathode 212 connected to ground through condenser 214 and resistor 216, the cathode 212 also being connected to the junction between the plate resistor 196 and the voltage dropping resistor 198 by resistor 218.

The output of the coincidence mixer circuit 10 is impressed upon the input of the integrator and discriminator circuit 220. The integrator and discriminator circuit 220 incorporates a vacuum tube 222 having a grid 224 coupled to the plate 192 of vacuum tube 174 of the coincidence mixer circuit 10 through a coupling condenser 226 and a crystal rectifier 228. Vacuum tube 222 has a plate 230 connected to the positive terminal of battery 194 through voltage dropping resistor 198, and a cathode 232 connected to the ground circuit 58 through a cathode resistor 234. The grid 224 is also connected to the ground circuit 58 through a resistor 236. The output from the integrator and discriminator circuit 220 is taken from the cathode 232 of vacuum tube 222 through a pair of series connected resistors 238 and 240. The resistors 238 and 240 are shunted by a crystal rectifier 242 connected to pass negative charges from the cathode 232, and the junction between the two resistors 238 and 240 is by-passed to the ground circuit 58 by a condenser 244. A resistor 245 is connected between the ground circuit 58 and the junction of resistor 240 and crystal rectifier 242. A condenser 246 is connected between the plate 230 of vacuum tube 222 and the ground circuit 58.

The output from the integrator and discriminator circuit 220 is impressed upon the input of the multivibrator circuit 248. The multivibrator circuit 248 uses vacuum tubes 250 and 252 connected in a conventional multivibrator circuit, and hence this circuit has not been described in detail. The output of the multivibrator circuit 248 is taken from a plate 254 of vacuum tube 252, and is in the form of a negative pulse suitable for counting purposes. An output connector 256 is coupled to the plate 254, and is adapted to be connected to a pulse counter.

Vacuum tube 174 of the coincidence mixer 10 is normally essentially non-conducting, and will become conducting only when positive pulses are impressed upon both of the control grids 176 and 180 at the same time. If a positive pulse is impressed upon only one of these control grids 176 or 180, vacuum tube 174 will remain essentially non-conducting regardless of the amplitude of the pulse. Hence, the pulses emerging from the coincidence mixer circuit 10 may be counted and represent the occurrences of pulses from the two pulse sources during the same interval of time.

The pulses appearing upon the plate 192 of vacuum tube 174 could be counted directly by the multivibrator 248, particularly when relatively large pulses are being used throughout the circuit. However, when it is desired to record the coincidences between pulses of relatively small amplitude, the greatest sensitivity is obtained in the coincidence mixer circuit 10 when a small amount of plate current flows through vacuum tube 174 at all times. Under these conditions, the occurrence of a pulse upon only one of the control grids 176 or 180 of vacuum tube 174 will produce a small pulse on the plate 192 of vacuum tube 174. Hence, it will be necessary to distinguish between the pulses developed upon the plate 192 of vacuum tube 174 which are the result of a pulse appearing upon only one of the two control grids 176 or 180 and those which are the result of pulses appearing upon both of the control grids 176 and 180. The integrator and discriminator circuit 220 is for this purpose.

Since it is not necessary to operate with pulses of short time duration, condenser 226, crystal rectifier 228, and resistor 236 integrate the pulses appearing in the output of the coincidence mixer circuit 10 and impress these relatively long negative pulses upon the grid 224 of vacuum tube 222. Both the larger and the smaller pulses coming from the coincidence mixer circuit 10 appear as negative pulses upon the cathode 232 of vacuum tube 222, and from this point the larger pulses are discriminated from the smaller pulses. Vacuum tube 222 is continuously conducting, thereby establishing a positive bias on the cathode 232 as a result of current flowing through resistor 234 and resistors 238, 240 and 245. The junction point between resistor 240, crystal rectifier 242 and resistor 245 thus assumes a potential positive with respect to the ground circuit 58 and negative with respect to the cathode 232. A negative pulse appearing at the cathode 232 of vacuum tube 222 will only pass through the crystal rectifier 242 if it is of greater magnitude than the difference in the potential appearing on opposite sides of the crystal rectifier 242, since it must travel to a point of lower positive potential. As a result, all pulses of a lesser magnitude than the potential across crystal rectifier 242 will leak through the cathode resistor 234 to the ground circuit 58, since the resistance of resistor 234 will be much less than the sum of resistors 238, 240 and 245. In this manner, only the larger negative pulses will be transmited to the multivibrator circuit 248.

In one embodiment of the present invention, the coincidence mixer circuit 10 made use of a type 6BN6 vacuum tube for vacuum tube 174. The cathode 212 of vacuum tube 174 was biased between 5.4 and 8.3 volts positive, and the accelerator 200 received a positive potential of approximately 40 volts. Battery 194 delivered 250 volts potential to the circuit. Crystal rectifiers 186, 190, 228 and 242 were type 1N34 crystal rectifiers. The integrator and discriminator circuit used 1 section of a type 12AU7 vacuum tube for vacuum tube 222. The cathode resistor 234, resistor 238 and resistor 240 were 5100 ohms, and resistor 245 was 51,000 ohms. With these values, the cathode 232 received a positive bias of approximately 11 volts and the junction point of resistor 240, resistor 245 and crystal rectifier 242 received a positive potential of approximately 9 volts. The circuit would thus discriminate against all pulses which were not more than 2 volts negative.

The foregoing description of one embodiment of the present invention has been specific and will suggest many other embodiments to the man skilled in the art. For this reason, it is intended that the scope of the present invention be not limited by the foregoing description thereof, but only by the appended claims.

What is claimed is:

1. A device for measuring the coincidences of electrical pulses from different sources comprising, in combination, a channel for each source of electrical pulses, each channel having means to delay a pulse, means to integrate a pulse, and means to subtract the pulse delayed from the pulse integrated, and means for counting the coincidences of pulses connected to the channels.

2. A device for measuring the coincidences of electrical pulses from different sources comprising, in combination, a channel for each source, each channel having means to delay a pulse, means to integrate a pulse, means to subtract the pulse delayed from the pulse integrated, and means to algebraically add a pedestal pulse to the difference of said integrated and delayed pulses, and means for counting the coincidences of pulses connected to the channels.

3. A device for measuring the coincidences of electrical pulses from different sources comprising, in combination, a channel for each source of pulses, each channel having means to delay a pulse, means to integrate a pulse, and means to subtract the pulse delayed from the pulse integrated, a coincidence mixer connected to each pair of pulse channels, a discriminator circuit connected to the output of the coincidence mixer for discriminating against pulses having amplitudes less than a threshold value, and a counter connected to the output of the discriminator circuit for counting pulses having greater amplitudes than the threshold value.

4. A device for measuring the coincidences of electrical pulses from two sources comprising, in combination, two input channels, each channel having means to delay a pulse, means to integrate a pulse, means to subtract the pulse delayed from the pulse integrated, and means to algebraically add a pedestal pulse to the difference pulse from the integrated and delayed pulses, a coincidence mixer connected to the output of said channels, and a pulse counter connected to the output of the coincidence mixer.

5. A device for measuring the coincidences of electrical pulses from two sources comprising the elements of claim 4 in combination with a discriminator circuit connected between the coincidence mixer and the counter, said discriminator discriminating against pulses having amplitudes lower than a threshold value and conducting pulses having greates amplitudes to the counter.

6. A device for measuring the coincidences of electrical pulses from a plurality of pulse sources comprising, in combination, a channel for each source, each channel having a delay line adapted to be connected to a pulse source, an integrating circuit adapted to be connected to the same pulse source, a difference amplifier having inputs connected to the output of the delay line and integrating circuit, a coincidence mixer connected to the outputs of the difference amplifiers of the channels, and a counter connected to the output of the coincidence mixer.

7. A device for measuring the coincidences of electrical pulses from a plurality of pulse sources comprising, in combination, a channel for each source, each channel having a delay line adapted to be connected to a pulse source, an integrating circuit adapted to be connected to the same pulse source, a multivibrator adapted to be connected to the same pulse source, and a difference amplifier having inputs connected to the output of the delay line, integrating circuit, and multivibrator, said amplifier subtracting the delayed pulse from the integrated pulse, a coincidence mixer connected to the outputs of each pair of channels, and a counter connected to the output of each coincidence mixer.

8. A device for measuring the coincidences of electrical pulses from a plurality of pulse sources comprising the elements of claim 7 in combination with a discriminator connected between each coincidence mixer and the following counter, said discriminator discriminating against pulses having amplitudes smaller than a threshold value.

9. A device for measuring the coincidences of electrical pulses from a plurality of pulse sources comprising the elements of claim 8, wherein each channel is provided with a cathode follower having an input adapted to be connected to a source of pulses and an output connected to the delay line, and a second cathode follower having an input adapted to be connected to the same source of pulses and an output connected to the multivibrator.

10. A device for measuring the coincidences of electrical pulses from different sources comprising, in combination, a channel for each source of pulses, each channel having means to delay a pulse, means to iintegrate a pulse and means to subtract the pulse delayed from the pulse integrated, a coincidence mixer having inputs connected to the outputs of each pair of channels, an integrator and discriminator connected to the output of at least one coincidence mixer, said integrator and discriminator comprising a vacuum tube having a plate, grid, and cathode, the plate of said vacuum tube being directly connected to a source of voltage, the grid of said vacuum tube being connected to the output of the coincidence mixer through an integrating circuit, and the cathode of said vacuum tube being connected to the negative terminal of the source of voltage through two parallel paths, one of said paths comprising a single resistor, and the other of said paths comprising at least two resistors and a crystal rectifier, said crystal rectifier being connected between the cathode and the junction point between the two resistors in said second path and connected to pass positive charges to the cathode, and a counter connected to the junction point of the crystal rectifier and the two resistors in said second path.

11. A device for transforming pulses of random amplitudes to pulses of equal amplitude comprising means to delay the pulses, means to integrate the pulses, and means to subject the pulses delayed from the pulses integrated.

12. A device for transforming pulses of random amplitudes to pulses of equal amplitudes comprising, in combination, means to delay a pulse, means to integrate a pulse, means to subtract the pulse delayed from the pulse integrated, and means to algebraically add a pedestal pulse to the difference between the integrated and delayed pulses.

BERNARD SMALLER.

No references cited.